US012643110B2

(12) United States Patent
Nagatani, Jr. et al.

(10) Patent No.: US 12,643,110 B2
(45) Date of Patent: Jun. 2, 2026

(54) IN-PROCESS ADJUSTMENT TO CRUSHING SYSTEMS

(71) Applicant: X Development LLC, Mountain View, CA (US)

(72) Inventors: Ray Anthony Nagatani, Jr., San Francisco, CA (US); Allen Richard Zhao, Mountain View, CA (US); Antonio Raymond Papania-Davis, Oakland, CA (US); Weishi Yan, Oakland, CA (US); Brian Howell, Berkeley, CA (US); Jeffrey Bush, Los Altos, CA (US); Charles Stephen Spirakis, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 516 days.

(21) Appl. No.: 17/990,558

(22) Filed: Nov. 18, 2022

(65) Prior Publication Data

US 2024/0165634 A1     May 23, 2024

(51) Int. Cl.
B02C 25/00     (2006.01)
G05B 13/02     (2006.01)
G05B 13/04     (2006.01)

(52) U.S. Cl.
CPC ............ B02C 25/00 (2013.01); G05B 13/027 (2013.01); G05B 13/042 (2013.01)

(58) Field of Classification Search
CPC .... B02C 25/00; G05B 13/027; G05B 13/042; G06N 20/10; G06N 20/20; G06N 3/044;

(Continued)

(56) References Cited

U.S. PATENT DOCUMENTS 3,970,841 A * 7/1976 Green ................ G01N 15/1468
                                                       250/222.2
8,585,786 B2 11/2013 Drozd et al.
(Continued)

FOREIGN PATENT DOCUMENTS

DE        102021117537        10/2022

OTHER PUBLICATIONS

Guyot et al., "VisioRock, an integrated vision technology for advanced control of comminution circuits," Minerals Engineering, Nov. 1, 2004, 17(11-12):1227-1235.

(Continued)

*Primary Examiner* — Tameem D Siddiquee
(74) *Attorney, Agent, or Firm* — Fish & Richardson P.C.

(57)                    ABSTRACT

Methods, systems, and apparatus, including computer programs encoded on computer storage media, for in-process adjustment to crushing systems. A method includes obtaining pre-crush particle data indicating characteristics of a portion of particles before crushing the portion of particles with a crushing system; obtaining settings data indicating one or more settings of the crushing system; obtaining post-crush particle data indicating characteristics of the portion of particles after crushing the portion of particles; and training a prediction model using the pre-crush particle data, the settings data, and the post-crush particle data, comprising: processing, using the prediction model, the pre-crush particle data and the settings data to obtain a corresponding output including predicted characteristics of the portion of particles after crushing the portion of particles with the crushing system; and adjusting parameters of the prediction model based on comparing the output of the prediction model to the post-crush particle data.

21 Claims, 11 Drawing Sheets

(58) Field of Classification Search
    CPC .. G06N 3/0455; G06N 3/0464; G06N 3/0499;
                G06N 3/086; G06N 3/09; G06N 3/092;
                        G06V 10/52; G06V 10/82
    See application file for complete search history.

(56)                    References Cited

U.S. PATENT DOCUMENTS

| | | | |
|---|---|---|---|
| 10,113,952 B2 | 10/2018 | Washburn | |
| 10,226,817 B2 | 3/2019 | Dave et al. | |
| 10,246,379 B2 | 4/2019 | Niven et al. | |
| 10,657,300 B1 | 5/2020 | Kim et al. | |
| 10,768,130 B2 | 9/2020 | Ghods et al. | |
| 10,875,288 B2 | 12/2020 | Chapiro et al. | |
| 10,984,145 B1 | 4/2021 | Hutchinson et al. | |
| 11,004,037 B1 * | 5/2021 | Ling ..................... | G06N 20/00 |
| 2014/0259895 A1 | 9/2014 | Mason | |
| 2016/0174590 A1 | 6/2016 | Boggavarapu | |
| 2018/0000108 A1 | 1/2018 | Boggavarapu | |
| 2020/0041264 A1 * | 2/2020 | Bilodeau ................ | G01N 21/85 |
| 2020/0202127 A1 * | 6/2020 | Chen ..................... | G06Q 50/02 |
| 2021/0127701 A1 | 5/2021 | Hohener et al. | |
| 2022/0127192 A1 | 4/2022 | Berodier et al. | |
| 2023/0010394 A1 * | 1/2023 | Häberle ................ | G06V 10/82 |
| 2023/0237783 A1 * | 7/2023 | Banerjee ................ | G01S 17/86 |
| | | | 382/103 |

OTHER PUBLICATIONS

International Search Report in International Appln. No. PCT/US2023/
080113, dated Apr. 19, 2024, 13 pages.
International Preliminary Report on Patentability Appln. No. PCT/
US2023/080113, dated Apr. 29, 2025, 7 pages.

* cited by examiner

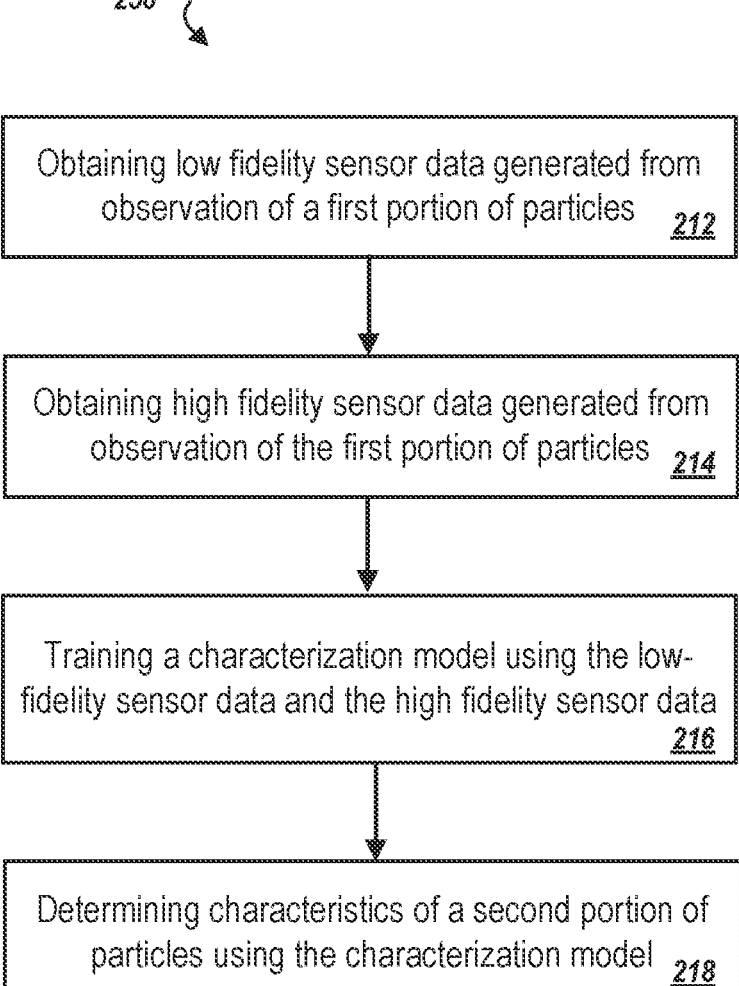

250

Obtaining low fidelity sensor data generated from observation of a first portion of particles    *212*

Obtaining high fidelity sensor data generated from observation of the first portion of particles    *214*

Training a characterization model using the low-fidelity sensor data and the high fidelity sensor data    *216*

Determining characteristics of a second portion of particles using the characterization model    *218*

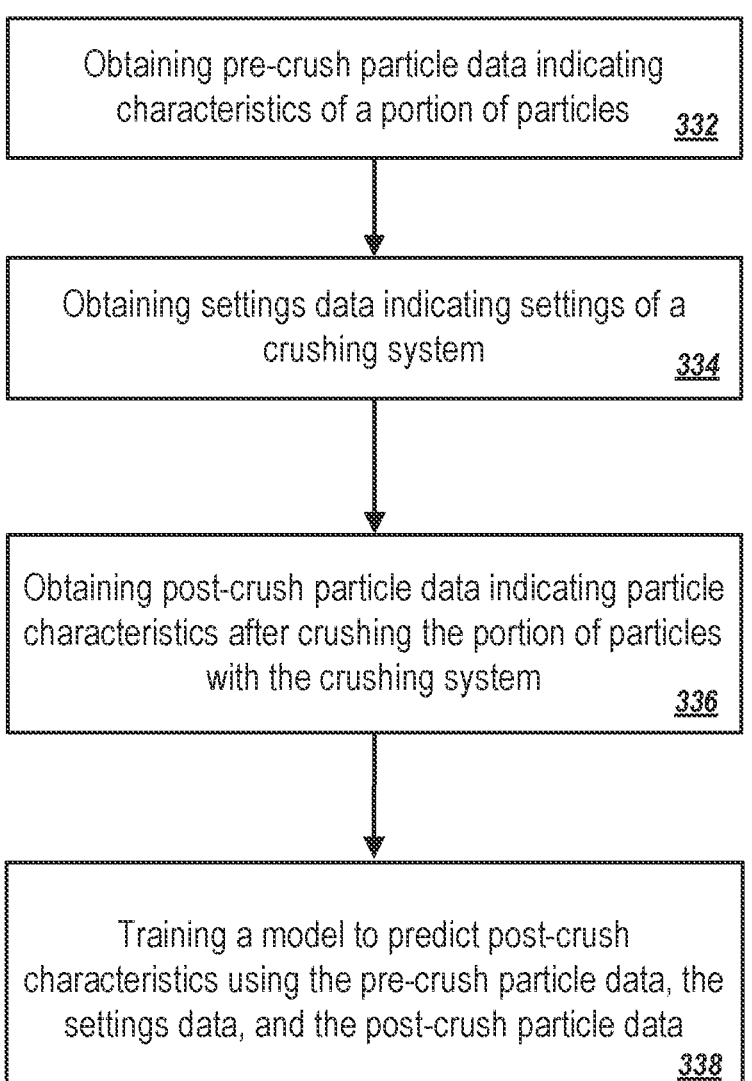

Obtaining pre-crush particle data indicating characteristics of a portion of particles     332

Obtaining settings data indicating settings of a crushing system     334

Obtaining post-crush particle data indicating particle characteristics after crushing the portion of particles with the crushing system     336

Training a model to predict post-crush characteristics using the pre-crush particle data, the settings data, and the post-crush particle data     338

FIG. 3B

450

---

Obtaining pre-crush particle data indicating
characteristics of a portion of particles before
crushing the portion of particles
with a crushing system          _402_

---

Processing the pre-crush particle data using a
prediction model to obtain predicted post-crush
characteristics of the portion of particles          _404_

---

Adjusting settings of the crushing system based on
an error between the predicted post-crush
characteristics and target characteristics          _406_

```
┌─────────────────────────────────────────────┐
│  Obtaining sensor data generated from         │
│  observation of a portion of crushed          │
│  particles output by a crushing system   502  │
└─────────────────────────────────────────────┘
                      │
                      ▼
┌─────────────────────────────────────────────┐
│  Processing the sensor data with a            │
│  characterization model to obtain             │
│  characteristics of the portion of            │
│  crushed particles                       504  │
└─────────────────────────────────────────────┘
                      │
                      ▼
┌─────────────────────────────────────────────┐
│  Adjusting settings of the crushing system    │
│  based on an error between the post-crush      │
│  characteristics and target characteristics    │
│                                          506  │
└─────────────────────────────────────────────┘
```

FIG. 5B

IN-PROCESS ADJUSTMENT TO CRUSHING SYSTEMS

TECHNICAL FIELD

This specification relates generally to rock aggregate crushing processes.

BACKGROUND

Billions of tons of aggregate are used worldwide each year for construction of buildings, roadways, and other critical infrastructure. Much of the aggregate is composed of crushed rock produced by surface quarries. Quarries vary significantly in age and production output, with some producing over ten million tons of aggregate per year. In quarry operations, aggregate is produced from orebodies via digging, dredging, or blasting. Output aggregate is often then loaded onto conveyor belts where it is transported to crushing equipment. Aggregate output from quarries can suffer from inconsistency between multiple batches. In some cases, the output product distribution differs significantly from specifications with market demand, leading to waste and cost associated with storing and removing products with low demand.

Collecting real-time data on rock crusher output can be challenging due to the scale and speed of operations. With thousands of tons of aggregate moving through quarry systems daily, it is desirable to perform comprehensive testing of output aggregate while maintaining high productivity. Collecting size and shape data on individual particles of aggregate require large amounts of data to be collected and stored. There is a need for real-time or in-process data analysis in order to implement operational changes in order to change the output aggregate distribution to align with target output.

SUMMARY

In general, this disclosure relates to processes and systems for in-process adjustment to crushing systems. A prediction model can be trained to predict post-crushing characteristics of aggregate particles undergoing a crushing process. For example, a prediction model can receive, as input, data indicating geometric and chemical characteristics of particles to be crushed by a rock crushing system. The input can include, for example, characterizations of particles generated by a particle characterization model. The prediction model can also receive, as input, data indicating settings of the rock crushing system. The prediction model can process the input data to generate output data including predicted characteristics of the particles after crushing. Parameters of the prediction model can be adjusted based on comparing the predicted characteristics to measured characteristics of the particles post-crushing. In some examples, the measured characteristics of the particles are determined by providing low resolution, or low fidelity, sensor data to the characterization model. After training, the prediction model can be used to predict post-crushing characteristics of particles.

The estimated characterization of particles output by a characterization model can be used to adjust parameters of processes for crushing aggregate. For example, a computing system can determine an error by comparing the estimated characteristics of a batch of crushed aggregate particles that have been output by a crushing system to target characteristics. In some examples, the estimated characteristics can be determined using low resolution sensor data processed by a characterization model. Based on the error, the computing system can perform a feedback control process to adjust settings of the crushing system.

In some examples, the computing system can determine an error by comparing predicted post-crushing characteristics of a batch of crushed aggregate particles to target characteristics. In some examples, the predicted post-crushing characteristics can be output by a prediction model. Based on the error, the computing system can perform a feed-forward control process to adjust settings of the crushing system.

Sensor data from input aggregate, output aggregate, or both, can be synchronized with operational settings of the crushing system, such as data conveyor belt speed, cone rotation speed, cone distance, material feed speed, working surface aperture size, crusher operating speed, and other settings.

The sensor data and operational settings can be provided as an input to models or algorithms that can be used to continuously update operational settings to achieve the desired distribution of output aggregate. In some implementations, the models can be integrated with crushing system equipment in order to continuously optimize operational settings in an automated fashion.

The subject matter described in this specification can be implemented in various implementations and may result in one or more of the following advantages. The disclosed systems can provide high throughput, accurate characterization of large volumes of aggregate particles. The systems can provide real-time adjustment of crushing system parameters during the crushing process. The disclosed techniques can be implemented to increase and improve uniformity in crushed particles output by a crushing system. The disclosed techniques can be implemented to align characteristics of crushed particles with target characteristics. Target characteristics can be updated over time, for example, based on user input. The disclosed techniques can improve crushing system efficiency and reduce waste by improving the quality of output crushed particles. The disclosed techniques can be applied to characterization and processing optimization of any mined or recycled aggregate that undergoes a crushing process.

The present disclosure provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Other implementations of the above aspects include corresponding systems, apparatus, and computer programs, configured to perform the actions of the methods, encoded on computer storage devices. The details of one or more embodiments of the subject matter described in this specification are set forth in the accompanying drawings and the description below. Other features, aspects, and advantages of the subject matter will become apparent from the description, the drawings, and the claims.

3

Figure 2A:
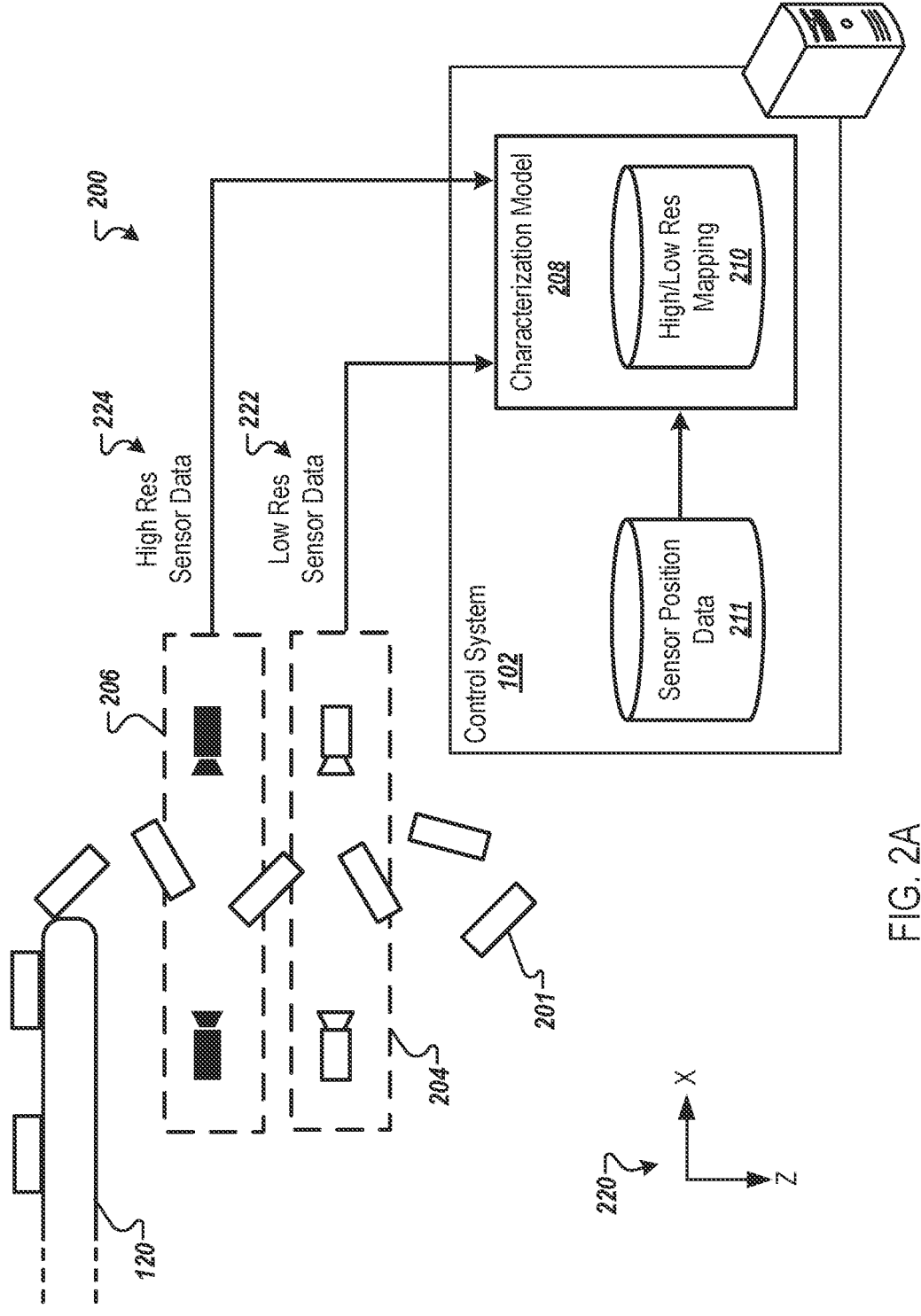

FIG. 2A depicts an example system for training a particle characterization model.

Figures 2B, 2C, 2D:
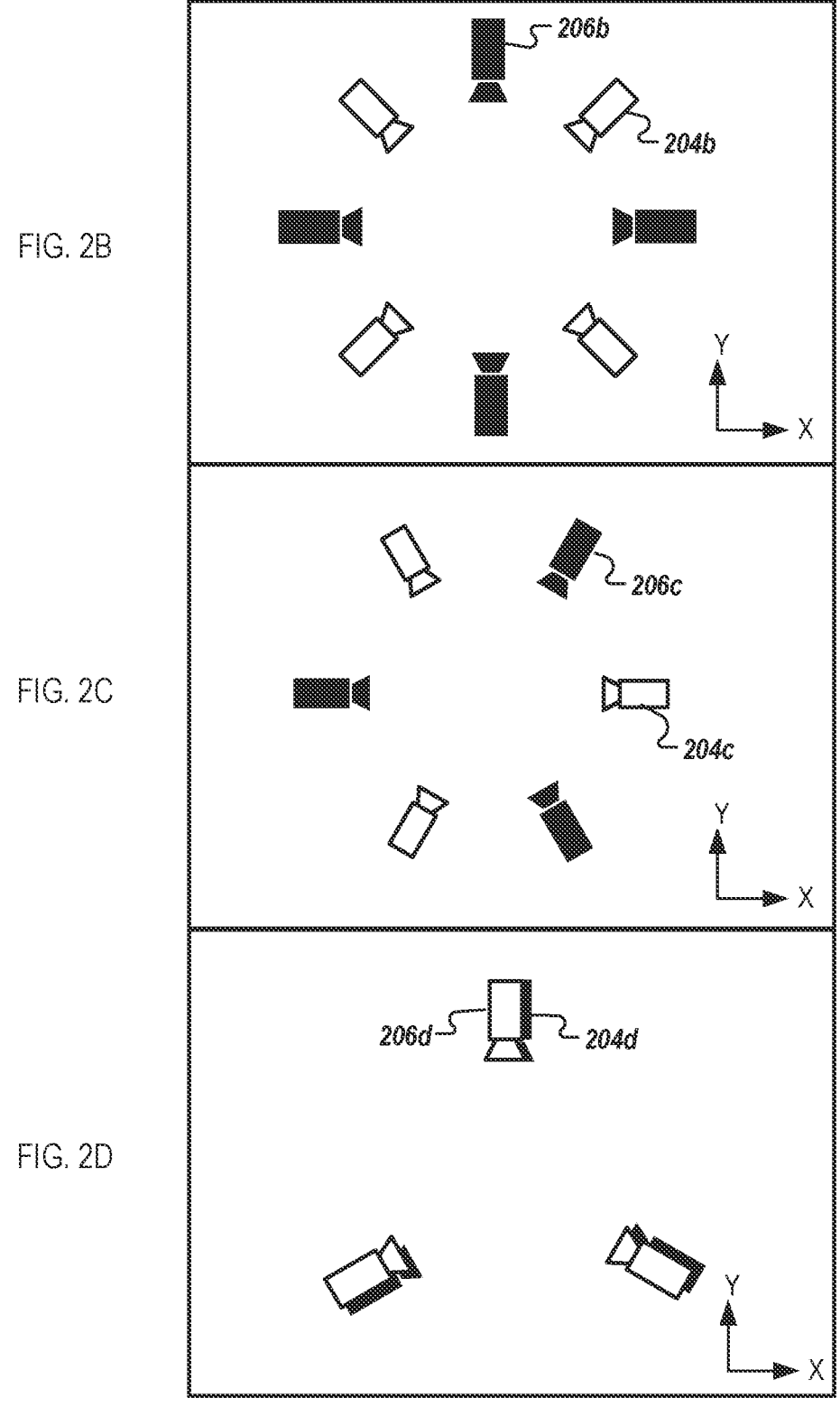

FIGS. 2B, 2C, and 2D show overhead views of example sensor arrangements.

FIG. 2E is a flow diagram that illustrates a process for training and implementing a particle characterization model.

Figure 3A:
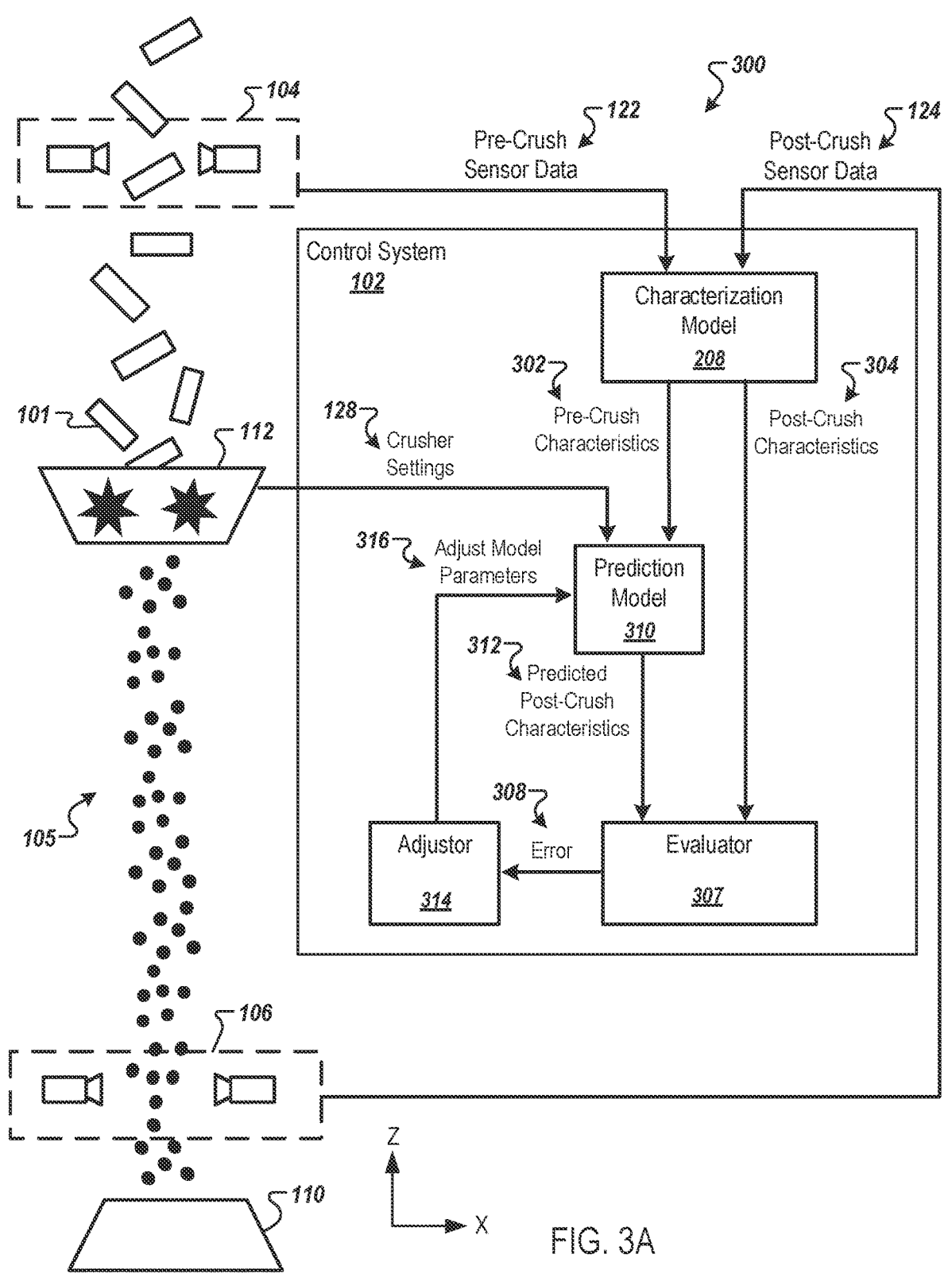

FIG. 3A depicts an example system for training a prediction model to predict post-crush particle characteristics of crushed particles output from a crusher.

FIG. 3B a flow diagram that illustrates a process for training a prediction model.

Figure 4A:
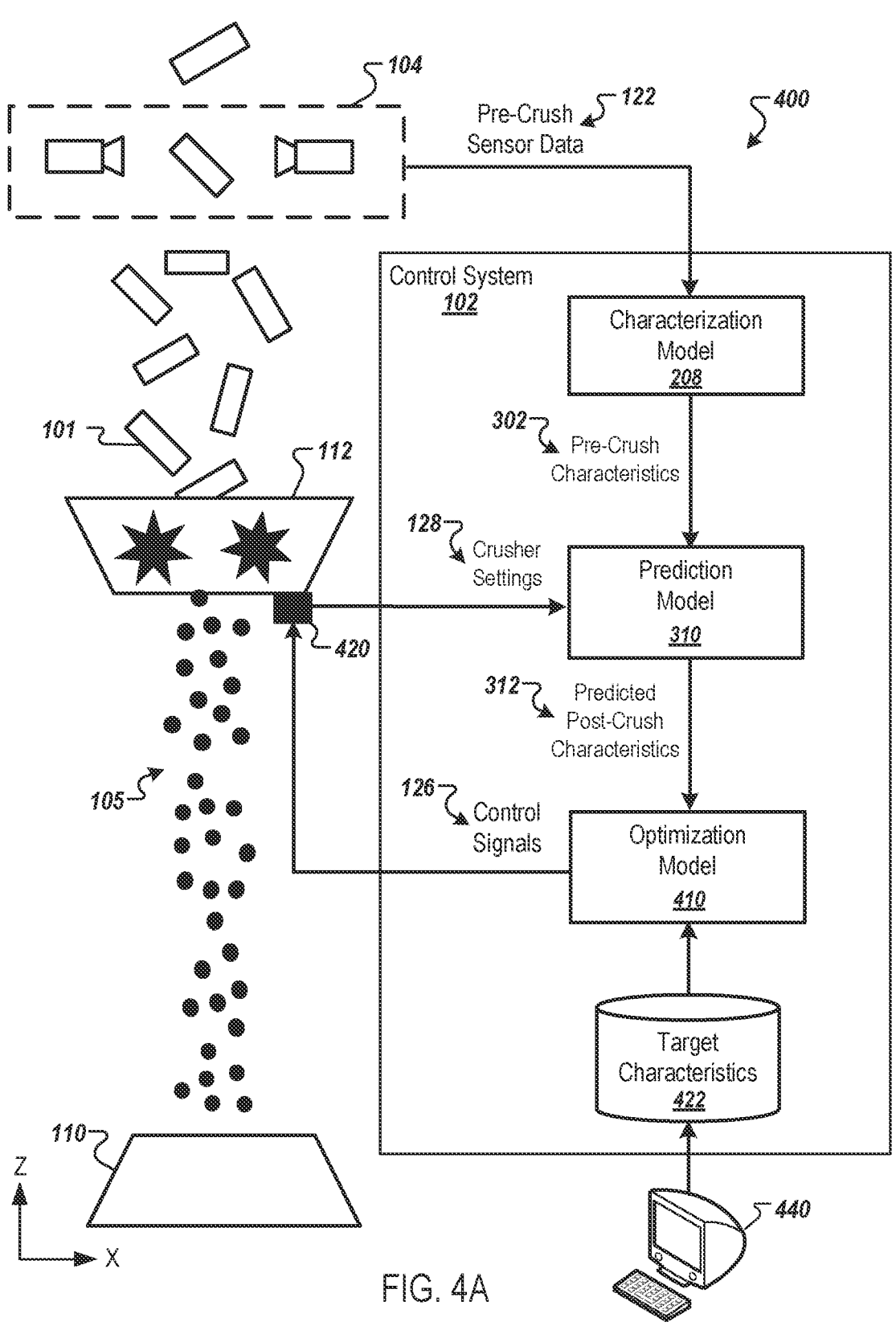

FIG. 4A depicts an example system for optimizing crusher settings based on predicted post-crush characteristics.

FIG. 4B is a flow diagram that illustrates a process for optimizing crusher settings using predicted post-crush characteristics.

Figure 5A:
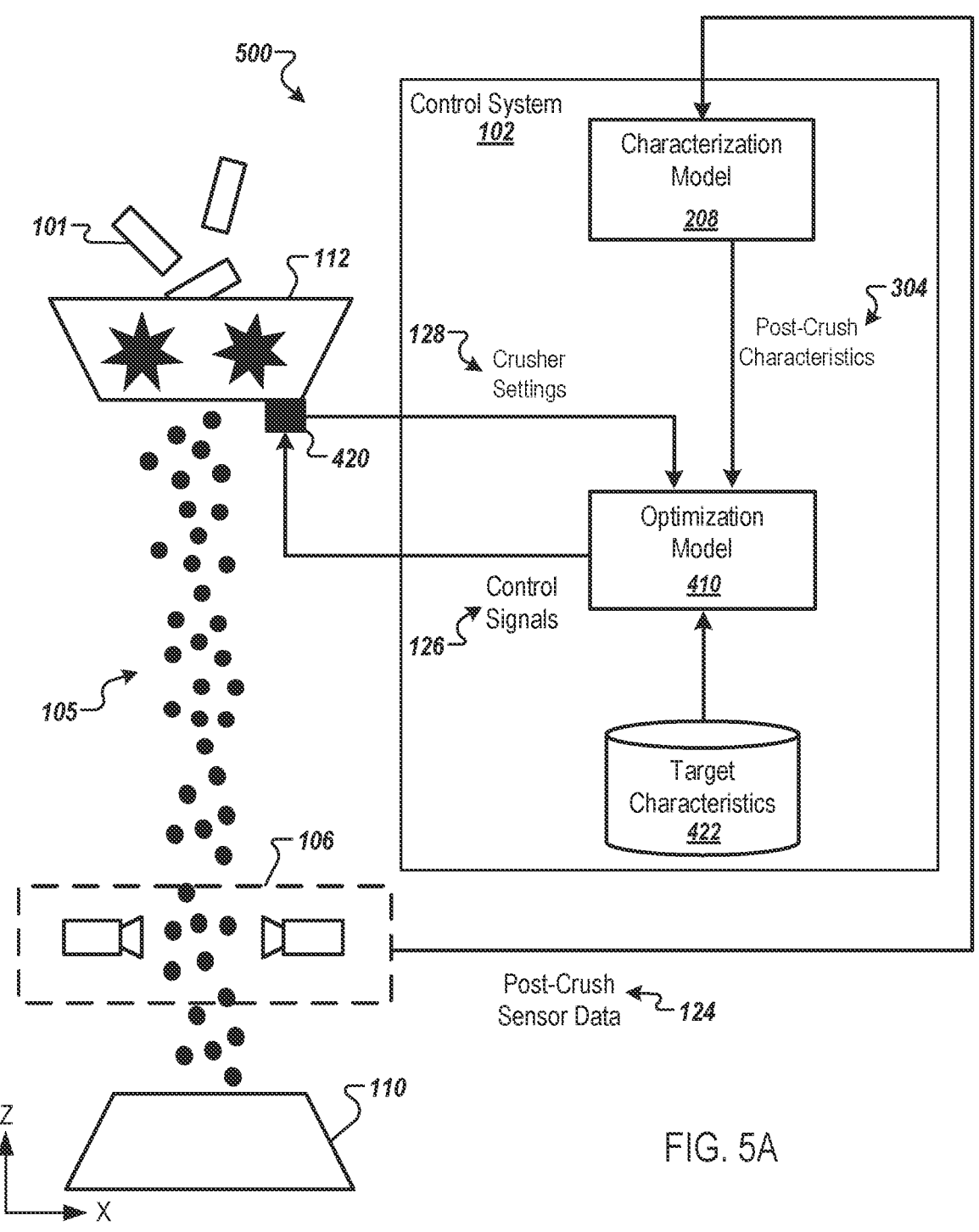

FIG. 5A depicts an example system for optimizing crusher settings based on observed post-crush characteristics.

FIG. 5B depicts a flow diagram that illustrates a process for optimizing crusher settings using observed post-crush characteristics.

Figure 6:
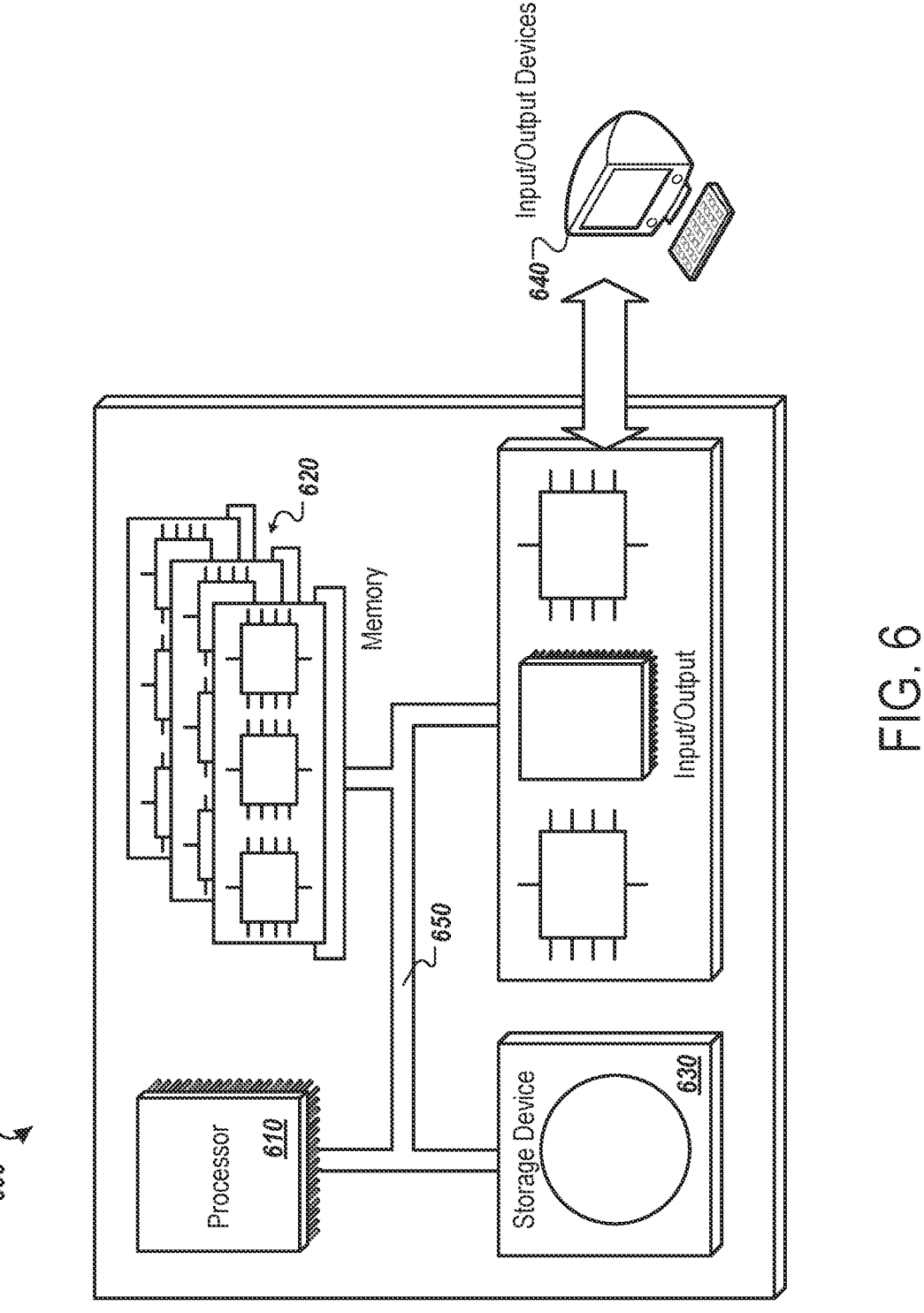

FIG. 6 depicts a schematic diagram of a computer system that may be applied to any of the computer-implemented methods and other techniques described herein.

Like reference numbers and designations in the various drawings indicate like elements.

DETAILED DESCRIPTION

Figure 1:
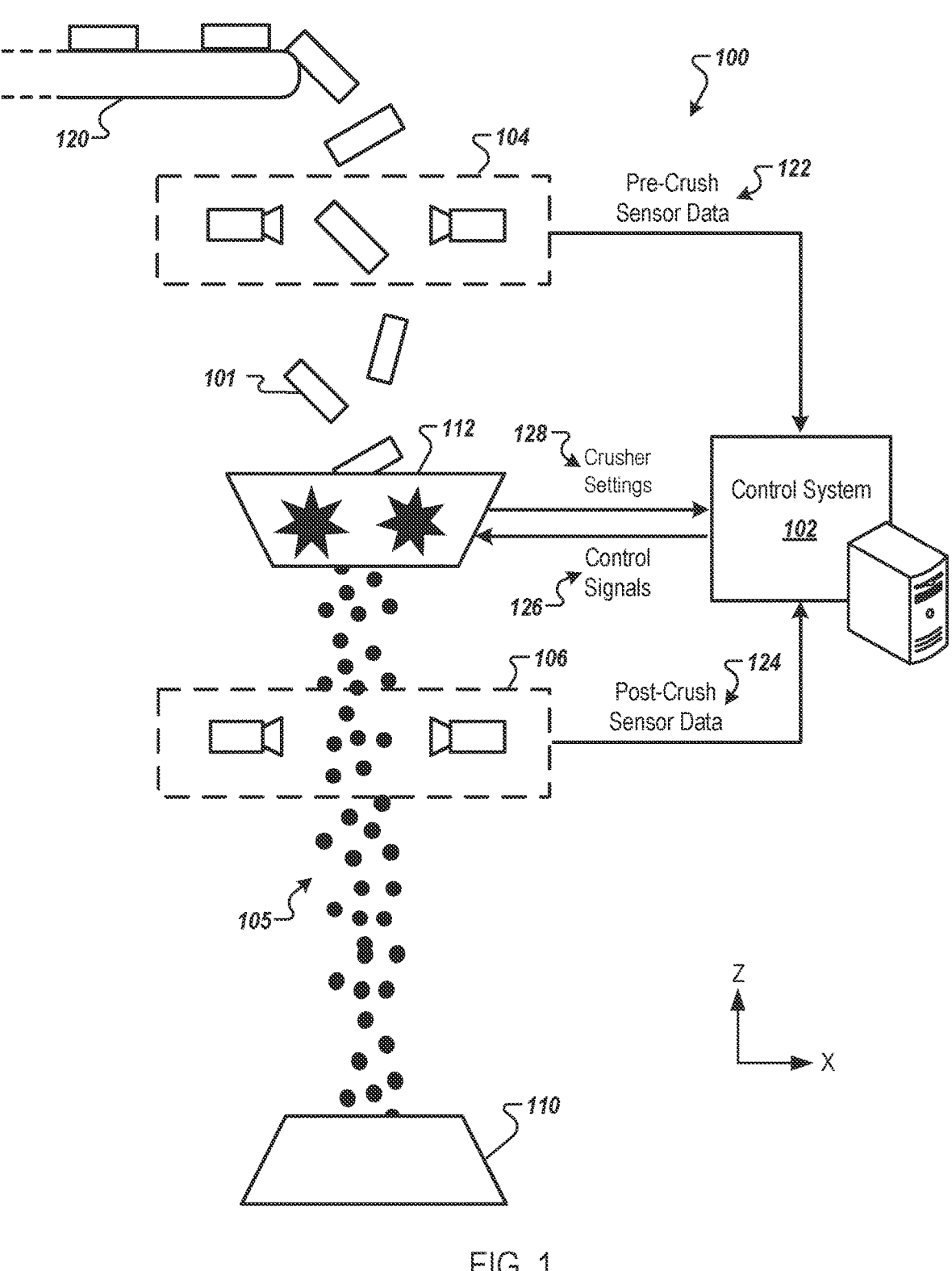
FIG. 1 depicts an example particle crushing system.

FIG. 1 depicts an exemplary rock crushing system 100. In operation, the crushing system 100 crushes aggregate particles 101 in a crusher 112. The crusher 112 can be any type of crusher, such as cone jaw, roller, or impact. The crusher 112 can crush the aggregate particles 101 to particular sizes and/or geometries. Operations of the crusher 112 can be controlled by control signals 126 from a control system 102. For example, control signals 126 from the control system 102 can control crusher settings 128 and cause the crusher 112 to increase or decrease sizes of crushed particles 105.

The control system 102 can analyze the crushed particles 105 using pre-crush sensor data 122 from the pre-crush sensors 104. The pre-crush sensors 104 generate sensor data from measurement of particles prior to the particles being crushed by the crusher 112. The control system 102 is configured to control various aspects of the crushing process. For example, control system 102 can store and execute one or more computer instruction sets to control the execution of aspects of the crushing processes described herein. Control system 102 can include a system of one or more computing devices. The computing devices can be, e.g., a system of one or more servers. For example, a first server can be configured to receive and process data from the pre-crush sensors 104. Another server can be configured to interface with the crusher 112 and issue control commands based on analysis results from the first server.

The pre-crush sensors 104 can include various different sensors configured to measure various characteristics of particles. For example, the sensors used by the pre-crush sensors 104 can include, but are not limited to, optical sensors (e.g., visible light cameras, infra-red cameras, near IR (NIR) sensors, dynamic optical microscopy sensors) and mechanical sensors (e.g., sieves, sedigraphs, impact hammer, electrodynamic vibrator), and spectrometers. In some examples, diffuse reflectance spectroscopy can be used across the visible, near- and shortwave-infrared spectral regions (400 nm to 2500 nm) as a tool to assess the strength of particles.

Analysis of the aggregate particles 101 can be determined by but is not limited to NIR optical sensing and regression models to correlate reactant content with images in samples. In some examples, sensor data from the pre-crush sensors 104 can be used to create a synthetic digital twin of the crushed particles 105.

The pre-crush sensor data 122 is used by the control system 102 to determine characteristics of the aggregate particles 101. For example, particle characteristics can include, but are not limited to, particle sizes, shapes, textures, surface areas, sphericity, porosity, density, strength, and particle size distribution. In some examples, the pre-crush sensor data 122 can be used to determine exposure of particles to elements such as seawater.

Crushed particles 105 can be conveyed from the crusher 112 to downstream processing systems. In some examples, the crushed particles 105 can be conveyed by a series of augers and conveyors, e.g., conveyor 120. The crushed particles 105 are passed through post-crush sensors 106 enroute to a stockpile 110. The post-crush sensors 106 generate sensor data from measurement of particles after the particles are crushed by the crusher 112. In some examples, the post-crush sensors 106 are positioned vertically below the crusher 112. The post-crush sensors 106 can observe crushed particles as the particles fall past the post-crush sensors 106 due to gravity.

The post-crush sensors 106 are arranged to obtain post-crush sensor data 124 of particles. For example, in some implementations optical sensors can be arranged in an array along a conveyor or a chute used to convey the particles. The post-crush sensors 106 can transmit post-crush sensor data 124 to the control system 102. In some examples, the post-crush sensors 106 can include the same type or types of sensors as the pre-crush sensors 104. In some examples, the post-crush sensors 106 can have a same or similar arrangement as the arrangement of the pre-crush sensors 104.

Aggregate particles that are mined from a quarry can have a high variability of characteristics and qualities. Aggregate particles can vary in mineral make up, size distributions, shape distributions, compression strength, and/or specific gravity. Aggregate particles can vary in composition, e.g., as a result of geologic conditions specific formation in which the aggregate particles are formed, as a result of how the aggregate particles are produced, or both. Aggregate particles can be formed, for example, through digging, dredging, or blasting. As a result, particles input into crushing equipment can vary significantly, leading to downstream variance in output crushed particles.

Parameters of aggregate particle crushing operations can vary. Crushing equipment can vary due to the age of equipment, equipment wear, suitability of equipment for the aggregate input particles, operator skill, and equipment settings. Equipment settings can include speed of aggregate addition, distance of crusher cone or jaws from crusher wall, speed of crushing equipment operation, jaw aperture, material feed speed, working surface aperture size, and crusher operating speed. As a result, variability in output crush particles stemming from the heterogeneity of inputs particles is compounded by operational variability.

FIG. 2A depicts an example system 200 for training a particle characterization model 208. The system 200 includes high resolution sensors 206. The high resolution sensors 206 are high data output sensors, or high fidelity sensors, that generate high resolution sensor data 224. The system 200 includes low resolution sensors 204. The low resolution sensors 204 are low data output sensors, or low fidelity sensors, that generate low resolution sensor data 222.

The control system 102 stores a characterization model 208. The characterization model 208 includes a mapping 210 of high resolution sensor data 224 to low resolution sensor data 222. The characterization model 208 can be developed through a training process. In some examples, the training process can be performed in a lab setting.

Multiple sensors can be arranged to measure aggregate particles. In some examples, sensors can be arranged in an array or ring around a location where aggregate particles fall in a stream, e.g., off of a conveyor belt. As shown in FIG. 2A, the aggregate particles 201 fall downward due to gravity. The direction of gravity is represented by the z-axis in coordinate system 220. In the example of FIG. 2A, the high resolution sensors 206 are positioned vertically above the low resolution sensors 204. In some examples, the high resolution sensors 206 can have a same elevation as the low resolution sensors 204. In some examples, the high resolution sensors 206 can be positioned vertically below the low resolution sensors. In some examples, individual low resolution sensors 204 can have different elevations from each other. In some examples, individual high resolution sensors 206 can have different elevations from each other. Example sensor arrangements are described in greater detail with reference to FIGS. 2B, 2C, and 2D.

In some examples, the high resolution sensors 206, the low resolution sensors 204, or both can measure the particles 201 while the particles are on the conveyor 120. For example, the high resolution sensors 206, the low resolution sensors 204, or both, can be arranged around the conveyor 120, and can measure the particles 201 while the particles are stationary or moving on the conveyor 120. In some examples, the low resolution sensors 204 can be positioned at a different location than the high resolutions sensors 206. For example, the low resolution sensors 204 can be arranged around a location where aggregate particles fall, and the high resolution sensors 206 can be arranged around the conveyor 120 or at a different location.

In some examples, the low resolution sensors 204 can measure the aggregate particles 201 in a main stream of aggregate particles 201, and the high resolution sensors 206 can obtain measurements of samples of aggregate particles 201 from the main stream. For example, the low resolution sensors 204 can be arranged to measure the main stream of aggregate particles 201 on the conveyor 120 or falling off of the conveyor 120, and samples of aggregate particles 201 can be diverted to a different sample-measuring location. The high resolution sensors 206 can take measurements of the samples at the sample-measuring location. Each sample can include, for example, several kilograms of aggregate particles. In some examples, the samples can be diverted from the main stream using a diversion gate. In this way, the system 200 uses an integrated process to take samples of aggregate particles for high resolution scanning.

In some examples, the high resolution sensors 206, low resolution sensors 204, or both, can be arranged in a stereoscopic assembly. The low resolution sensors 204, high resolution sensors 206, or both, can be solar powered and can incorporate a wired or wireless communication system to communicate with the control system 102. Data from multiple sensors can be aggregated to produce an estimate of the dimensions of the particles passing through the sensor ring. For example, data from all of the low resolution sensors 204 can be aggregated together, and data from all of the high resolution sensors 206 can be aggregated together. Thus, the sensor data can be generated using non-contact sensor measurement.

FIGS. 2B, 2C, and 2D show overhead views of example sensor arrangements. In some examples, high resolution sensors can be interspersed with a same or similar number and/or spacing of low resolution sensors. For example, referring to FIG. 2B, high resolution sensors 206b, shaded black, are interspersed with low resolution sensors 204b, shaded white, to form a ring or circle. The high resolution sensors 206b and low resolution sensors 204b can generate sensor data from measurement of aggregate particles falling through the ring, e.g., falling downward in the z-direction due to gravity. The high resolution sensors 206b are offset from each other by approximately ninety degrees in the x-y plane. The low resolution sensors 204b are offset from each other by approximately ninety degrees in the x-y plane. In some examples, each of the high resolution sensors 206b is positioned at the same or approximately the same elevation along the z-axis. In some examples, the high resolution sensors 206b and low resolution sensors 204 are positioned at the same or approximately the same elevation along the z-axis.

Referring to FIG. 2C, high resolution sensors 206c, shaded black, are interspersed with low resolution sensors 204c, shaded white, to form a ring. The high resolution sensors 206c are offset from each other by approximately one hundred-twenty degrees in the x-y plane. The low resolution sensors 204c are offset from each other by approximately one hundred-twenty degrees in the x-y plane.

In some examples, a ring of low resolution sensors 204 can be positioned above or below the ring of high resolution sensors 206. In some examples, the low resolution sensors 204 can be offset from the high resolution sensors 206 in the x-y plane. In some examples, each low resolution sensor can be aligned vertically, e.g., in the z-direction, with one of the high resolution sensors. Sensors that are aligned vertically can have the same or similar perspective in the x-y plane. In some examples, sensors that are aligned vertically can have the same or similar orientation or pose.

Referring to FIG. 2D, low resolution sensors 204d, shaded white, are positioned vertically above high resolution sensors 206d, shaded black. Each low resolution sensor 204d is aligned, or approximately aligned, with one of the high resolution sensors 206d in the z-direction. Fields of view of the low resolution sensors 204d and the aligned high resolution sensors 206d can overlap and can be the same or similar.

The high resolution sensors 206 are used to obtain high resolution sensor data 224 generated from measurement of a batch of aggregate particles 201 at an individual particle scale. The high resolution sensors 206 can include, for example, high resolution laser displacement scanners, stereoscopic camera assemblies, and LiDAR sensors. A high resolution sensor 206 can be, for example, a sensor having a spatial resolution of one millimeter or less (e.g., five hundred microns or less, one hundred microns or less). The high-resolution sensors 206 can generate data representing geometric and chemical characteristics of aggregate particles. The characteristics can include, for example, size, shape, and surface area for each individual particle. The high resolution sensor data 224 can include measurements of surface area measured on a scale of microns.

The control system 102 can use the low throughput, high resolution sensor data 224, to determine characteristics of individual aggregate particles. The characteristics can include geometric characteristics such as size, shape, texture, porosity, and surface area data for each individual particle in the batch of aggregate particles 201. The characteristics can include chemical properties such as hydration, chemical composition, and oxidation state. Chemical composition, including mineral type, can indicate a particle's crystalline structure and mechanical characteristics. Chemical composition can also indicate characteristics such as potential reactivity. The characteristics for each individual particle in the batch of aggregate particles 201 can be used to determine characteristics of the batch as a whole. For example, the control system 102 can determine, for the batch of aggregate particles 201, statistical representations of each characteristic.

The low resolution sensors 204 can be used to obtain low resolution sensor data 222 generated from measurement of the batch of aggregate particles 201 at a batch scale. The low resolution sensors 204 can include, for example, ultrasound sensors, depth cameras, multi-camera arrays, line scanners, and monochrome cameras. A low resolution sensor 204 can be, for example, a sensor having a spatial resolution of one millimeter or greater (e.g., several millimeters or greater, one centimeter or greater, one inch or greater). Low resolution sensor data 222 can include image data and/or pixel data generated by the low resolution sensors 204 from measurement of the batch of aggregate particles 201.

The control system 102 can store sensor position data for sensors including the low resolution sensors 204 and the high resolution sensors 206. The sensor position data 211 can include, for each sensor, a height or elevation of the sensor. The sensor position data 211 can include, for each sensor, a position relative to a center of the stream of aggregate particles 201, a position relative to other sensors, or both. In some examples, the sensor position data 211 can include a two-dimensional coordinate position or a three-dimensional coordinate position. The coordinate position can be relative to a reference location, e.g., a location where aggregate particles 201 fall off the conveyor.

In some examples, the high resolution sensor data 224 and the low resolution sensor data 222 includes, for each instance of data, metadata indicating the position of the sensor that generated the instance of data. In some examples, the sensor position data 211 includes an identifier for each sensor. The identifier can be associated with a sensor location, orientation, perspective, pose, or any of these. The high resolution sensor data 224 and the low resolution sensor data 222 can include, for each instance of data, metadata including the identifier for the sensor that generated the instance of data.

The control system 102 can aggregate data from the high resolution sensors and low resolution sensors, and data indicating each sensors' location relative to the aggregate stream and other sensors. The data can be aggregated to obtain an estimate of the dimensions of the aggregate particles 201 going through the center of the sensor ring.

In some examples, the low resolution sensor data 222, the high resolution sensor data 224, or both, can be time-stamped. The characterization model can map high resolution sensor data 224 generated by a particular high resolution sensor to low resolution sensor data 222 generated by a particular low resolution sensor for the same particle based on the associated timestamps and based on the relative position of the particular high resolution sensor to the particular low resolution sensor.

The characterization model 208 is trained using input data including the high resolution sensor data 224 and the low resolution sensor data 222. An example characterization model 208 can be a neural network machine learning model.

During a training process, the characterization model 208 receives, as input, the low resolution sensor data 222 and the high resolution sensor data 224. The training process uses the high resolution sensor data as training data (e.g., a representation of approximate ground truth data). During the training process, the characterization model 208 determines correlations and/or mappings between low resolution sensor data 222 and high resolution sensor data 224 representing the same batches of aggregate particles 201.

In some examples, the high resolution sensor data 224 includes measurements of particle texture, particle surface area, or both. For a given shape and size of particle, texture can be related to surface area. For example, a rough or jagged particle generally has a greater surface area than a smooth particle of the same size and shape.

The high resolution sensor data 224 can include shape data that indicates the shape of a particle. The shape data can include, for example, data indicating aspect ratio, convexity, concavity, of any combination of these. The shape data can be used to determine surface area of a particle. For example, a particle having a non-convex shape generally has a greater surface area per volume compared to a particle having a convex shape.

The characterization model 208 includes mapping data 210 indicating the correlations between the low resolution sensor data 222 and the high resolution sensor data 224. For example, the mapping data 210 can include mappings between surface areas of particles, determined from the high resolution sensor data 224, and shapes of particles, determined from the low resolution sensor data 222.

In some examples, the mapping data 210 can include correlations between two-dimensional pixel data generated by the low resolution sensors 204 and three- or four-dimensional pixel data generated by the high resolution sensors 206 for the same particles. The characterization model 208 can thus be trained to approximate dimensions of aggregate particles using lower quality, lower-resolution sensor data. In other words, the characterization model 208 is trained to characterize particles using only the lower quality (and lower bandwidth) sensor data, while approximating the accuracy that would be achieved using the higher quality (and higher bandwidth) sensor data. The characterization model 208 can apply a model of particle texture, generated from the high resolution sensor data 224, to particle shape characteristics, determined using the low resolution sensor data 222. The trained characterization model 208 therefore enables more computationally efficient and faster system operations for characterizing aggregate particles.

After the training process, the characterization model 208 can be periodically updated by scanning batches of aggregate particles at lab scale, e.g., using high resolution sensors such as laser displacement scanners. At lab scale, a low volume or throughput of aggregate particles can be analyzed. In some examples, a first volume of aggregated particles can be scanned during a first period of time, after which the first volume of aggregate particles can be replaced with a second volume of aggregate particles. The second volume of aggregate particles can then be scanned during a second period of time.

The low volume of aggregate particles can include a low mass of aggregate particles. In some examples, a low mass of aggregate particles is a metric ton or less of aggregate particles. In some examples, a throughput of aggregate particles used for training the characterization model 208 can be one hundred kilograms per hour or less (e.g., fifty kilograms per hour or less, ten kilograms per hour or less).

FIG. 2E is a flow diagram that illustrates a process 250 for training and implementing a particle characterization model. The process 250 can be performed by one or more computing devices. For example, the process 250 can be performed by the control system 102. Operations of process 250 are described as being performed by a control system. However, some or all of the operations may be performed by various operation modules of a particle crushing system.

The process 250 includes obtaining low fidelity sensor data generated from measurement of a first portion of particles (212). For example, the control system 102 can obtain low fidelity sensor data, or low resolution sensor data 222, generated from measurement of a first portion of aggregate particles 201 by the low resolution sensors 204. In some examples, the low fidelity sensor data indicates shape characteristics, size characteristics, or both, of each particle of the first portion of particles.

The process 250 includes obtaining high fidelity sensor data generated from measurement of the first portion of particles (214). For example, the control system 102 can obtain high fidelity sensor data, or high resolution sensor data 224, generated from measurement of the first portion of aggregate particles 201 by the high resolution sensors 206. In some examples, the high fidelity sensor data indicates a surface area, a texture, or both, of each particle of the first portion of particles.

The process 250 includes training a characterization model using the low fidelity sensor data and the high fidelity sensor data (216). For example, the characterization model 208 can be trained using the low resolution sensor data 222 and the high resolution sensor data 224. In some examples, the characterization model 208 can be trained by providing, as training data to the characterization model, the high fidelity sensor data, and processing the high fidelity sensor data with the characterization model to correlate the high fidelity sensor data with the low fidelity sensor data. In some examples, correlating the high fidelity sensor data with the low fidelity sensor data includes mapping surface area and/or texture characteristics, indicated by the high fidelity sensor data, to shape and/or size characteristics, indicated by the low fidelity sensor data. In some examples, the characterization model 208 includes a mapping between shapes and surface areas of particles. In some examples, the characterization model 208 includes a mapping between shapes and textures of particles. In some examples, the characterization model 208 can be trained, using a small volume of aggregate particles. The small volume of aggregate particles can be, for example, aggregate particles having a combined mass of one hundred kilograms or less.

The process 250 includes determining characteristics of a second portion of particles using the characterization model (218). For example, the characterization model 208 can be used to determine characteristics of a second portion of particles. The trained characterization model 208 can determine characteristics of aggregate particles using low resolution sensor data generated by low fidelity, high throughput sensors. In some examples, the low resolution sensor data can indicate shape and/or size characteristics of the second portion of particles. The characterization model 208 can output characteristics of the second portion of particles including data indicating surface areas and/or textures of the second portion of particles.

To determine the characteristics of the aggregate particles, the trained characterization mode 208 can apply models of texture and/or surface area, generated at low throughput during the training process, to the shapes and/or sizes of particles determined using the low fidelity sensor data at high throughput. Thus, the characterization model 208 can determine characteristics of aggregate particles without high resolution sensor data obtained using high fidelity, low throughput sensors. The ability to characterize particles at high throughput improves the accuracy and efficiency of aggregate processing operations performed at industrial scale. A high throughput is a mass flow rate of aggregate particles that is greater than the mass flow rate of aggregate particles at low throughput. In some examples, the mass flow rate of aggregate particles at high throughput is at least a hundred times the mass flow rate of aggregate particles at low throughput. In some examples, the mass flow rate of aggregate particles at high throughput is at least a thousand times the mass flow rate of aggregate particles at low throughput.

The trained characterization model 208 can be used to characterize pre-crush particles, post-crush particles, or both. For example, the characterization model 208 can receive, as input, sensor data generated from measurement of crushed or uncrushed particles, and can generate output including characteristics of the crushed or uncrushed particles. The characterization model 208 can be used to characterize aggregate particles on site, e.g., in a quarry, where large volumes of aggregate particles are produced. The second portion of particles can include a larger volume of aggregate particles, compared to the first portion of particles. For example, the second portion of particles can be one metric ton of particles or more. In some examples, the mass of the second portion of particles is at least one hundred times greater than the mass of the first portion of particles. In some examples, the mass of the second portion of particles is at least one thousand times greater than the mass of the first portion of particles. In some examples, the mass of the second portion of particles is at least ten thousand times greater than the mass of the first portion of particles.

FIG. 3A depicts an example system 300 for training a prediction model 310 to predict post-crush particle characteristics of crushed particles 105 output from the crusher 112. In general, pre-crush sensor data 122 is generated by low resolution pre-crush sensors 104 from measurements of a batch of aggregate particles 101 before crushing the batch of aggregate particles 101 with a crusher 112. The characterization model 208 determines pre-crush characteristics 302 from the pre-crush sensor data 122. The prediction model 310 outputs predicted post-crush characteristics 312.

Post-crush sensor data 124 is generated by post-crush sensors 106 from measurement of crushed particles output from the crusher 112. The characterization model 208 determines post-crush characteristics 304 from the post-crush sensor data 124. The post-crush characteristics can include geometric and chemical characteristics of the crushed particles 105. The post-crush characteristics 304 can be used as ground truth data to train the prediction model 310.

An evaluator 307 can compare the predicted post-crush characteristics 312 to the post-crush characteristics 304 to determine an error. An adjustor 314 can adjust parameters 316 of the prediction model 310 based on the error 308. Thus, the prediction model 310 can be trained over time, reducing the error between the predicted post-crush characteristics 312 and the post-crush characteristics 304 determined by the characterization model 208.

In some implementations, control system 102 includes a set of operations modules for controlling different aspects of a crushing process. The operation modules can be provided as one or more computer executable software modules, hardware modules, or a combination thereof. For example, one or more of the operation modules can be implemented as blocks of software code with instructions that cause one or more processors of the control system 102 to execute operations described herein. In addition or alternatively, one or more of the operations modules can be implemented in electronic circuitry such as, e.g., programmable logic circuits, field programmable logic arrays (FPGA), or application specific integrated circuits (ASIC). The operation modules can include the characterization model 208, the prediction model 310, an evaluator 307, and an adjustor 314.

In some implementations, the prediction model 310 can include a machine learning model to estimate post-crush characteristics from measured pre-crush characteristics. The prediction model 310 can be, for example, a deterministic model such as a neural network, or a probabilistic model such as a Gaussian process. In some examples, the machine learning model is trained on experimental data to receive pre-crush characteristics as input, and to generate a predicted output, e.g., estimated post-crush characteristics.

In some implementations, the machine learning model is a deep learning model that employs multiple layers of models to generate an output for a received input. A deep neural network is a deep machine learning model that includes an output layer and one or more hidden layers that each applies a non-linear transformation to a received input to generate an output. In some cases, the neural network may be a recurrent neural network. A recurrent neural network is a neural network that receives an input sequence and generates an output sequence from the input sequence. In particular, a recurrent neural network uses some or all of the internal state of the network after processing a previous input in the input sequence to generate an output from the current input in the input sequence. In some other implementations, the machine learning model is a convolutional neural network. In some implementations, the machine learning model is an ensemble of models that may include all or a subset of the architectures described above.

In some implementations, the machine learning model can be a feedforward autoencoder neural network. For example, the machine learning model can be a three-layer autoencoder neural network. The machine learning model may include an input layer, a hidden layer, and an output layer. In some implementations, the neural network has no recurrent connections between layers. Each layer of the neural network may be fully connected to the next, there may be no pruning between the layers. The neural network may include an ADAM optimizer, or any other multi-dimensional optimizer, for training the network and computing updated layer weights. In some implementations, the neural network may apply a mathematical transformation, such as a convolutional transformation, to input data prior to feeding the input data to the network.

In some implementations, the machine learning model can be a supervised model. For example, for each input provided to the model during training, the machine learning model can be instructed as to what the correct output should be. The machine learning model can use batch training, training on a subset of examples before each adjustment, instead of the entire available set of examples. This may improve the efficiency of training the model and may improve the generalizability of the model. The machine learning model may use folded cross-validation. For example, some fraction (the "fold") of the data available for training can be left out of training and used in a later testing phase to confirm how well the model generalizes. In some implementations, the machine learning model may be an unsupervised model. For example, the model may adjust itself based on mathematical distances between examples rather than based on feedback on its performance.

A machine learning model can be trained to estimate post-crush characteristics for particles based on measured characteristics of the particles output from the crusher 112. In some examples, the machine learning model can be trained on experimentally determined data relating known pre-crush characteristics of particles to experimentally determined post-crush characteristics.

Pre-crush sensor data 122 can be generated from measurement of a high volume of aggregate particles. In some examples, the high volumes, or throughputs, of aggregate particles can include a high mass of aggregate particles. A high mass of aggregate particles can be, for example, one metric ton or more of aggregate particles. In some examples, a high throughput of aggregate particles can be a mass flow rate of several metric tons of aggregate particles per hour or more (e.g., ten metric tons per hour or more, twenty metric tons per hour or more, thirty metric tons per hour or more). In some examples, the pre-crush sensor data 122 can be captured on site or in a field setting, e.g., at a quarry. In some examples, the pre-crush sensor data 122 can be captured continuously or continually during crushing operations. The high throughput of aggregate particles can be a mass flow rate that is greater than the mass flow rate of a low throughput of aggregate particles. For example, a high throughput of aggregate particles can be at least one hundred times the mass flow rate of a low throughput of aggregate particles, or at least one thousand times the mass flow rate of a low throughput of aggregate particles.

The pre-crush sensors 104 can be arranged to measure aggregate particles 101 prior to undergoing a crushing process by the crusher 112. For example, pre-crush sensors 104 can be arranged in a ring around a location where aggregate particles 101 fall in a stream, e.g., off of a conveyor belt. In some examples, the pre-crush sensors 104 are the same sensors as the low resolution sensors 204 that were used to train the characterization model 208. In some examples, the pre-crush sensors 104 are the same type of sensors as the low resolution sensors 204. In some examples, the pre-crush sensors have the same arrangement as the low resolution sensors 204. In some examples, the pre-crush sensors have a different arrangement than the low resolution sensors 204. The characterization model 208 can aggregate pre-crush sensor data 122 from the pre-crush sensors 104 to produce an estimate of the geometric and chemical characteristics of the particles passing through the sensor ring.

The trained characterization model 208 detects geometric and chemical characteristics using low resolution high throughput characteristics on site. For example, input low resolution pre-crush sensor data 122 obtained by a set of low resolution pre-crush sensors 104 from measurement of a batch of aggregate particles 101 in a production environment can be provided to the characterization model 208.

In some examples, the low resolution pre-crush sensor data 122 is obtained at intervals in order to sample batches of particles. In an example, aggregate particles falling off of a conveyor can be sampled by the pre-crush sensors 104 at intervals of one hour for a period of one minute for each sample. In another example, aggregate particles can be sampled by the pre-crush sensors 104 at intervals of one day for a period of one hour for each sample.

The characterization model 208 outputs pre-crush characteristics 302 of the batch of aggregate particles 101. In some examples, the characterization model 208 determines the pre-crush characteristics 302 using the mapping 210 of high resolution data to low resolution data. The pre-crush characteristics 302 can include geometric characteristics, chemical characteristics, or both. In some examples, the output data includes estimated geometric characteristics of each particle in a batch of aggregate particles. In some examples, the output data includes averaged geometric characteristics of the batch of aggregate particles. In some examples, the output data indicates a distribution of particle characteristics, e.g., data representing a distribution curve of histogram for each of multiple characteristics.

The chemical composition, size, and shape of a particle affects the shattering behavior of the particle when crushed. Thus, particles having different characteristics are crushed, the resulting crushed particles will also likely have different characteristics. A prediction model 310 can be trained to predict post-crushing characteristics of particles based on their respective pre-crush characteristics.

The input to the prediction model 310 can include, for example, the pre-crush characteristics 302 generated by the characterization model 208. For example, the prediction model can receive, as input, pre-crush characteristics 302 indicating geometric and chemical characteristics of the particles 101 to be crushed by a rock crushing system, e.g., crusher 112. In some examples, the pre-crush characteristics 302 can indicate rock qualities, e.g., shape characteristics, roughness, aspect ratio, volume.

The prediction model 310 can receive, as input, data indicating measurements and settings of the rock crushing system. In some examples, the prediction model 310 can receive, as input, crusher measurements such as displacement speed and force required to obtain a particular amount of displacement when crushing the particles 101. In some examples, the prediction model 310 can receive, as input, crusher settings 128 representing operational parameters of the crusher 112, e.g., material feed speed, working surface aperture size, and crusher operating speed, crush pressure, crusher lubricant flow rate.

The prediction model 310 can process the input data to generate output data including predicted characteristics of the particles after crushing. In some examples, the prediction model 310 can be trained to predict or simulate operations of the crusher 112 when crushing the particles 101.

The prediction model 310 can determine likely product outputs, e.g., predicted post-crush characteristics. Parameters of the prediction model can be adjusted based on comparing the predicted post-crush characteristics 312 to measured characteristics of the particles post-crushing. In some examples, the measured characteristics of the particles are determined by providing low resolution post-crush sensor data 124 to the characterization model 208. After training, the prediction model can be used to predict post-crushing characteristics of particles.

In some examples, the control system 102 can generate a dataset over time from multiple batches of particles. The dataset can be represented by $D_{tm;i-1}(x,y)$, where D is a data set for inputs x and outputs y at a time interval $t_i$. For a given time interval, the prediction model 310 can be trained using the corresponding dataset D. The output crushed particle characteristics are approximated by the prediction model 310 trained on the data from a set time interval $t_i$. Output of the prediction model can be represented using Equation 1.

$$y = f(x) \approx MLM(D_{t_m;i-1}(x,y))$$
<div align="right">Equation 1</div>

The prediction model 310 predicts the properties of aggregate particles exiting the crusher 112 as a function of the inputs, where m represents the number of past time intervals included in the prediction model 310. The prediction model 310, trained on a moving horizon data set, can then be used to predict the rock crusher 112 performance as a function of the input parameters.

The pre-crush sensor data 122 and the post-crush sensor data 124 can be timestamped and synchronized with the flow rate of particles through the crushing system. For example, based on the crusher settings 128, the control system 102 can determine an estimated time for an individual particle 101 to travel from the location of the pre-crush sensors 104 to the crusher 112, and for the resulting crushed particles to travel from the crusher 112 to the location of the post-crush sensors 116. Based on the estimated time of travel, and the time-stamped sensor data, the evaluator 307 can compare the post-crush characteristics 302 to the pre-crush characteristics 302 for the same particle or set of particles.

In an example, the estimated time of travel between the pre-crush sensors 104 and the post-crush sensors 106 may be thirty seconds. The characterization model 208 can determine pre-crush characteristics 302 for a first particle 101 that passes through the pre-crush sensors 104 at time 10:00:00 am, based on pre-crush sensor data timestamped with 10:00:00 am. The prediction model 310 can determine predicted post-crush characteristics for the first particle. The characterization model 208 can then determine post-crush characteristics 304 for crushed particles 105 passing through the post-crush sensors 106 thirty seconds later, based on post-crush sensor data timestamped with 10:00:30 am. The evaluator 307 can compare the predicted post-crush characteristics 312 with the post-crush characteristics 304 for the first particle to determine the error 308. In some examples, the evaluator 307 can compare predicted post-crush characteristics 312 with the post-crush characteristics 304 for data captured within a time window around a predicted travel time. For example, the evaluator 107 can compare predicted post-crush characteristics 312 with post-crush characteristics 304 averaged over a time window of plus or minus one second from the expected travel time, e.g., 10:00:29 am to 10:00:31 am.

FIG. 3B is a flow diagram that illustrates a process 350 for training a prediction model 310. The process 350 can be performed by one or more computing devices. For example, the process 350 may be performed by control system 102. Operations of process 350 are described as being performed by a control system. However, some or all of the operations may be performed by various operation modules of a particle crushing system.

The process 350 includes obtaining pre-crush particle data indicating characteristics of a portion of particles. (332). For example, the prediction model 310 receives, as input, the pre-crush characteristics 302 determined by the characterization model 208 through measurement of the particles 101 to be crushed by the crusher 112.

The process 350 includes obtaining settings data indicating settings of a crushing system (334). For example, the prediction model 310 receives, as input, the crusher settings 128 indicating settings of the crusher 112.

The process 350 includes obtaining post-crush particle data indicating particle characteristics of the portion of particles after crushing the portion of particles with the crushing system (336). For example, the characterization model 208 generates the post-crush characteristics 304 from post-crush sensor data 124 generated through measurement of the crushed particles 105 output by the crusher 112. The evaluator 307 compares the post-crush characteristics 304 to the predicted post-crush characteristics 312 determined by the prediction model 310. The adjustor 314 adjusts parameters 316 of the prediction model 310 based on the error 308 between the post-crush characteristics 304 and the predicted post-crush characteristics 312.

The process 350 includes training a model to predict post-crush characteristics using the pre-crush particle data, the settings data, and the post-crush particle data (338).

In general, operational parameters and settings of the crusher 112 can be adjusted based on the measured or predicted characteristics of crushed particles. FIG. 4A depicts an example system 400 for optimizing crusher settings 128 based on predicted post-crush characteristics 312.

The prediction model 310 receives, as input, pre-crush characteristics 302 determined by the characterization model 208 using pre-crush sensor data 122. The prediction model 310 correlates input geometry and chemistry to predicted crusher output.

The prediction model 310 outputs the predicted post-crush characteristics 312 to an optimization model 410. The optimization model 410 can be, for example, a machine learning model, a gaussian model, or a hybrid model. In some examples, the optimization model 410 is a data driven model or a physics model. The optimization model 410 can determine optimized crusher settings using, for example, Bayesian algorithms, genetic algorithms, active learning, Q learning, or any combination of these. In some examples, the optimization model 410 can include a PID control algorithm.

The optimization model 410 can output control signals 126 to adjust the settings of the crusher 112. In some examples, the crusher 112 is controlled by a controller 420 that is separate from the control system 102. The controller 420 receives the control signals 126 from the control system 102 and adjusts operations of the crusher 112 based on the control signals 126.

The crusher settings can include, for example, a materials feed rate, a crush speed, a mass flow rate or volumetric flow rate of aggregate particles through the crusher 112, a crusher working surface aperture size, or any of these. The feed rate of the crusher 112 can be measured by mass flow rate, e.g., in units of tons per hour. The feed rate of the crusher 112 is related to the feed belt speed. The crush speed of the crusher 112 can be measured as a cycle speed, e.g., in units of cycles per minute. A cycle can be, for example, an opening and closing cycle of jaws of a jaw crusher. In some examples, a cycle is a rotation in a gyratory cone crusher.

In some examples, the optimization model 410 can determine an error by comparing the predicted post-crush characteristics 312 to target characteristics 422. The target characteristics 422 can include target size and shape distributions. In some examples, the target characteristics 422 can be input to the control system 102 by an input/output device such as a computing device 440. The target characteristics 422 can be provided to the control system 102 as input by a user through the computing device 440.

In some examples, the target characteristics 422 can be generated by scanning a sample of particles that have desired characteristics. For example, the sample of particles can be scanned using post-crush sensors 106, and the post-crush sensor data 124 generated by the post-crush sensors can be provided to the characterization model 208. The characterization model 208 can determine the characteristics of the sample of particles. The characteristics of the sample of particles can be stored by the control system 102 and stored as target characteristics 422.

Based on the error between the predicted post-crush characteristics 312 and the target characteristics 422, the optimization model 410 can output the control signals 126 to adjust the crusher settings 128. The prediction model 310 can determine updated predicted post-crush characteristics 312 using the updated crusher settings 128. In some examples, the control system 102 can iteratively update the crusher settings 128 can determine predicted post-crush characteristics 312 until the error between the predicted post-crush characteristics 312 and the target characteristics 422 is at or below a threshold error.

In this way, the control system 102 can perform a feed-forward control process to adjust the settings of the crusher 112 to align the predicted post-crush characteristics 312 more closely with the target characteristics 422. In some examples, the optimization model 410 can adjust the crusher settings 128 to minimize the error between the predicted post-crush characteristics 312 and the target characteristics 422, subject to crusher setting limits.

The control system 102 can obtain post-crush sensor data 124 and generate updated control signals 126 over time. In some examples, the control system 102 can continuously or repeatedly update the control signals 126 until the predicted post-crush characteristics 312 match the target characteristics 422 within a threshold error.

FIG. 4B is a flow diagram that illustrates a process 450 for optimizing crusher settings using predicted post-crush characteristics. The process 450 can be performed by one or more computing devices. For example, the process 450 can be performed by the control system 102. Operations of process 450 are described as being performed by a control system. However, some or all of the operations may be performed by various operation modules of a particle crushing system.

The process 450 includes obtaining pre-crush particle data indicating characteristics of a portion of particles prior to crushing the particles with a crushing system (402). For example, the prediction model 310 can obtain pre-crush characteristics 302 generated by the characterization model 208 using pre-crush sensor data 122. The pre-crush sensor data 122 is generated from measurement of a batch of particles 101 input to the crusher 112.

The process 450 includes processing the pre-crush particle data using a prediction model to obtain an output including predicted post-crush characteristics of the portion of particles (404). For example, the prediction model 310 can process the pre-crush characteristics 302 and output predicted post-crush characteristics 312. The predicted post-crush characteristics 312 represented predicted characteristics of the crushed particles 105 output by the crusher 112.

The process 450 includes adjusting settings of the crushing system based on an error between the predicted post-rush characteristics and target characteristics (406). For example, the optimization model 410 can output control signals 126 that adjust crusher settings 128 based on an error between the predicted post-crush characteristics 312 and target characteristics 422.

The estimated post-crush characteristics 304 of particles output by the characterization model 208 can be used to adjust parameters of processes for crushing aggregate. FIG. 5A depicts an example system 500 for optimizing crusher settings 128 based on observed post-crush characteristics 304. The control system 102 can determine an error by comparing the estimated geometric characteristics of a batch of crushed aggregate particles that have been output by the crusher 112 to target characteristics. In some examples, the estimated characteristics can be determined using low resolution sensor data processed by the characterization model 208.

The characterization model 208 receives, as input, post-crush sensor data 124. The characterization model 208 outputs post-crush characteristics 304 to the optimization model 410. The optimization model 410 can be trained to optimize settings of the crusher 112 based on characteristics of aggregate being input to the crusher 112. The crusher settings 128 include, for example, crusher material feed rate, crusher operating speed, crusher working surface aperture, speed of crushing equipment operation, and other settings.

In some examples, the optimization model 410 can determine an error by comparing the post-crush characteristics 304 to target characteristics 422. Based on the error between the post-crush characteristics 304 and the target characteristics 422, the optimization model 410 can output the control signals 126 to adjust the crusher settings 128. In some examples, the control system 102 outputs the control signals 126 to the controller 420 of the crusher 112. The controller 420 receives the control signals 126 from the control system 102 and adjusts operations of the crusher 112 based on the control signals 126.

In some examples, the optimization model 410 can adjust the crusher settings 128 to minimize the error between the post-crush characteristics 304 and the target characteristics 422, subject to crusher setting limits. In some examples, the control system 102 can iteratively update the crusher settings 128 until the error between the post-crush characteristics 304 and the target characteristics 422 is at or below a threshold error. In this way, the control system 102 can perform a feedback control process to adjust the settings of the crusher 112 to align the post-crush characteristics 304 more closely with the target characteristics 422.

The control system 102 can obtain post-crush sensor data 124 and generate updated control signals 126 over time. In some examples, the control system 102 can continuously or repeatedly update the control signals 126 until the post-crush characteristics 304 match the target characteristics 422 within a threshold error.

FIG. 5B is a flow diagram that illustrates a process 550 for optimizing crusher settings using observed post-crush characteristics. The process 550 can be performed by one or more computing devices. For example, the process 550 can be performed by the control system 102. Operations of process 550 are described as being performed by a control system. However, some or all of the operations may be performed by various operation modules of a particle crushing system.

The process 550 includes obtaining sensor data generated from measurement of a portion of crushed particles output by a crushing system (502). For example, the control system 102 obtains post-crush sensor data 124 generated from measurement of crushed particles 505 output by the crusher 112.

The process 550 includes processing the sensor data with a characterization model to obtain an output including characteristics of the portion of crushed particles (504). For example, the characterization model 208 can process the post-crush sensor data 124 to output post-crush characteristics 304 of the crushed particles 505.

The process 550 includes adjusting settings of the crushing system based on an error between the predicted post-rush characteristics and target characteristics (506). For example, the optimization model 410 can output control signals 126 that adjust crusher settings 128 based on an error between the post-crush characteristics 304 and target characteristics 422.

The systems 400 and 500 can be implemented to use measurements of output crushed particles to suggest changes to operational settings to optimize a desired objective function representing equipment product output. Adjusting the settings over time can correct for aggregate particle characteristic drift, for crushing equipment parameter drift, or both. The real-time optimization processes can minimize the error between the desired output (target characteristics 422) and simulated output (predicted post-crush characteristics 312), subject to rock crusher setting limits. The real-time optimization processes can minimize the error between the desired output (target characteristics 422) and actual output (post-crush characteristics 304), subject to rock crusher setting limits. In some examples, the optimization model 410 can be trained to reduce and/or optimize both the error between the target characteristics 422 and predicted post-crush characteristics 312 and the error between the target characteristics 422 and post-crush characteristics 304.

FIG. 6 is a schematic diagram of a computer system 600. The system 600 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 600) and their structural equivalents, or in combinations of one or more of them. The system 600 is intended to include various forms of digital computers, such as laptops, desktops, workstations, personal digital assistants, servers, blade servers, mainframes, and other appropriate computers, including vehicles installed on base units or pod units of modular vehicles. The system 600 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transducer or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a non-transitory computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

In addition to the embodiments described above, the following embodiments are also innovative:

Embodiment 1 is a method comprising: obtaining pre-crush particle data indicating characteristics of a portion of particles before crushing the portion of particles with a crushing system; obtaining settings data indicating one or more settings of the crushing system; obtaining post-crush particle data indicating characteristics of the portion of particles after crushing the portion of particles with the crushing system; and training a prediction model using the pre-crush particle data, the settings data, and the post-crush particle data, the training comprising: processing, using the prediction model, the pre-crush particle data and the settings data to obtain a corresponding output of the prediction model, the corresponding output including predicted characteristics of the portion of particles after crushing the portion of particles with the crushing system; and adjusting parameters of the prediction model based on comparing the output of the prediction model to the post-crush particle data.

Embodiment 2 is the method of any of the preceding embodiments, wherein the pre-crush particle data is generated by a characterization model configured to determine particle characteristics from sensor data generated from measurements of the portion of particles before crushing the portion of particles with the crushing system.

Embodiment 3 is the method of any of the preceding embodiments, wherein the post-crush particle data is generated by a characterization model configured to determine particle characteristics from sensor data generated from measurements of the portion of particles after crushing the portion of particles with the crushing system.

Embodiment 4 is the method of any of the preceding embodiments, comprising determining, using the trained prediction model, predicted post-crush characteristics of a second portion of particles by: providing, to the prediction model, second pre-crush particle data indicating geometric and chemical characteristics of a second portion of particles before crushing the second portion of particles with the crushing system; and receiving, as output from the prediction model, predicted characteristics of the second portion of particles after crushing the second portion of particles with the crushing system.

Embodiment 5 is the method of any of the preceding embodiments, wherein the characteristics comprise geometric characteristics that include at least one of size, shape, surface area, or sphericity.

Embodiment 6 is the method of any of the preceding embodiments, wherein the characteristics indicated by the pre-crush particle data include chemical characteristics that include at least one of chemical composition, mineral type, crystalline structure, or reactivity.

Embodiment 7 is the method of any of the preceding embodiments, wherein the settings of the crushing system include at least one of material feed speed, working surface aperture size, or crusher operating speed.

Embodiment 8 is the method of any of the preceding embodiments, wherein the prediction model comprises a neural network model.

Embodiment 9 is a method comprising: predicting post-crush characteristics of a portion of particles, the post-crush characteristics including characteristics of the portion of particles after crushing by a crushing system, the predicting comprising: obtaining pre-crush particle data indicating characteristics of a portion of particles before crushing the portion of particles with a crushing system; obtaining settings data indicating one or more settings of the crushing system; processing the pre-crush particle data and the settings data using a prediction model to obtain a corresponding output of the prediction model, the corresponding output including predicted post-crush characteristics of the portion of particles; determining an error between the predicted post-crush characteristics of the portion of particles and target characteristics of crushed particles; and based on the error between the predicted post-crush characteristics of the portion of particles and the target characteristics of crushed particles, adjusting one or more settings of the crushing system.

Embodiment 10 is the method of any of the preceding embodiments, wherein the pre-crush particle data is generated by a characterization model configured to determine particle characteristics from sensor data generated from measurements of the portion of particles before crushing the portion of particles with the crushing system.

Embodiment 11 is the method of any of the preceding embodiments, wherein the settings of the crushing system include at least one of material feed speed, working surface aperture size, or operating speed.

Embodiment 12 is the method of any of the preceding embodiments comprising: iteratively predicting post-crush characteristics of crushed particles output by the crushing system and adjusting settings of the crushing system until the error between the predicted post-crush characteristics of crushed particles and the target characteristics of crushed particles is equal to or less than a threshold error.

Embodiment 13 is the method of any of the preceding embodiments, wherein the post-crush characteristics comprise geometric characteristics that include at least one of size, shape, surface area, or sphericity.

Embodiment 14 is the method of any of the preceding embodiments, comprising determining characteristics of a portion of crushed particles output by a crushing system; determining an error between the characteristics of the portion of crushed particles and target characteristics of crushed particles; and based on the error between the characteristics of the portion of crushed particles and the target characteristics of crushed particles, adjusting one or more settings of the crushing system that output the portion of crushed particles.

Embodiment 15 is the method of any of the preceding embodiments, wherein the characteristics comprise geometric characteristics that include at least one of size, shape, surface area, or sphericity.

Embodiment 16 is the method of any of the preceding embodiments, wherein determining the characteristics of the portion of crushed particles output by the crushing system comprises: obtaining sensor data generated from measurement of the portion of crushed particles by a set of sensors; and processing the sensor data with a characterization model to obtain the characteristics of the portion of crushed particles.

Embodiment 17 is the method of any of the preceding embodiments, wherein the set of sensors includes at least one of an ultrasound sensor, a depth camera, a multi-camera array, monochrome camera, a line scanner.

Embodiment 18 is the method of any of the preceding embodiments, wherein each of the sensors has a spatial resolution of one millimeter or greater.

Embodiment 19 is the method of any of the preceding embodiments, wherein the one or more settings of the crushing system include at least one of material feed speed, working surface aperture size, or operating speed.

Embodiment 20 is the method of any of the preceding embodiments comprising: iteratively determining characteristics of crushed particles output by the crushing system and adjusting settings of the crushing system until the error between the characteristics of the crushed particles and the target characteristics of crushed particles is equal to or less than a threshold error.

Embodiment 21 is the method of any of the preceding embodiments, wherein the pre-crush particle data is generated by a characterization model configured to determine particle characteristics from sensor data generated from measurements of the portion of particles before crushing the portion of particles with the crushing system.

Embodiment 22 is the method of any of the preceding embodiments, wherein the post-crush particle data is generated by a characterization model configured to determine particle characteristics from sensor data generated from measurements of the portion of particles after crushing the portion of particles with the crushing system.

Embodiment 23 is the method of any of the preceding embodiments, comprising determining, using the trained prediction model, predicted post-crush characteristics of a second portion of particles by: providing, to the prediction model, second pre-crush particle data indicating geometric and chemical characteristics of a second portion of particles before crushing the second portion of particles with the crushing system; and receiving, as output from the prediction model, predicted characteristics of the second portion of particles after crushing the second portion of particles with the crushing system.

Embodiment 24 is the method of any of the preceding embodiments, wherein the characteristics comprise geometric characteristics that include at least one of size, shape, surface area, or sphericity.

Embodiment 25 is the method of any of the preceding embodiments, wherein the characteristics indicated by the pre-crush particle data include chemical characteristics that include at least one of chemical composition, mineral type, crystalline structure, or reactivity.

Embodiment 26 is the method of any of the preceding embodiments, wherein the settings of the crushing system include at least one of material feed speed, working surface aperture size, or crusher operating speed.

Embodiment 27 is the method of any of the preceding embodiments, wherein the prediction model comprises a neural network model.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

As used herein, the term "real-time" can refer to transmitting or processing data without intentional delay given the processing limitations of a system, the time required to accurately obtain data, and the rate of change of the data. Although there may be some actual delays, the delays are generally imperceptible to a user. The term "real-time" can refer to performing actions without intentional delay given the processing limitations of a system, the time required to accurately analyze data, and time required to generate a control signal to perform the actions. Real-time performance of an action can include a delay between detection of a condition and initiation of the action of ten seconds or less (e.g., a delay of five seconds or less, three seconds or less, one second or less).

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
obtaining pre-crush particle data indicating characteristics of a portion of particles before crushing the portion of particles with a crushing system;
obtaining settings data indicating one or more settings of the crushing system;
determining, from the pre-crush particle data and the settings data and by a prediction model, predicted post-crush data that indicates predicted characteristics of the portion of particles at an output of the crushing system, wherein the prediction model is configured to receive both the pre-crush particle data and the settings data as input and predict how the crushing system will process the portion of particles based on both the pre-crush particle data and the settings data;
obtaining post-crush particle data indicating actual characteristics of the portion of particles at the output of the crushing system;
comparing the predicted post-crush data with the post-crush particle data to generate training data; and
training the prediction model with the training data.

2. The method of claim 1, wherein obtaining the pre-crush particle data comprises:
obtaining sensor data from a first sensor configured to capture low-resolution image of the portion of particles passing the first sensor at a high rate of throughput; and
generating the pre-crush particle data from the sensor data and by a characterization model configured to correlate low-resolution images with higher resolution images of particles and infer the pre-crush particle data based on the correlation.

3. The method of claim 1, wherein post-crush particle data is generated by a characterization model configured to determine particle characteristics from sensor data generated from measurements of the portion of particles after crushing the portion of particles with the crushing system.

4. The method of claim 1, comprising determining, using the trained prediction model, predicted post-crush characteristics of a second portion of particles by:
providing, to the prediction model, second pre-crush particle data indicating geometric and chemical characteristics of a second portion of particles before crushing the second portion of particles with the crushing system; and
receiving, as output from the prediction model, predicted characteristics of the second portion of particles after crushing the second portion of particles with the crushing system.

5. The method of claim 1, wherein the characteristics comprise geometric characteristics that include at least one of size, shape, surface area, or sphericity.

6. The method of claim 1, wherein the characteristics indicated by the pre-crush particle data include chemical characteristics that include at least one of chemical composition, mineral type, crystalline structure, or reactivity.

7. The method of claim 1, wherein the settings of the crushing system include at least one of material feed speed, working surface aperture size, or crusher operating speed.

8. The method of claim 1, wherein the prediction model comprises a neural network model.

9. A method comprising:

obtaining pre-crush particle data indicating characteristics of a portion of particles before crushing the portion of particles with a crushing system;

obtaining settings data indicating one or more settings of the crushing system;

determining, from the pre-crush particle data and the settings data and by a prediction model, predicted post-crush data that indicates predicted post-crush characteristics of the portion of particles at an output of the crushing system, wherein the prediction model is configured to receive both the pre-crush particle data and the settings data as input and predict how the crushing system will process the portion of particles based on both the pre-crush particle data and the settings data;

determining an error between the predicted characteristics of the portion of particles and target characteristics for crushed particles output by the crushed system;

re-training the prediction model with training data generated based on the error; and generating, from the error between the predicted post-crush characteristics and the target characteristics and by a control model, control signals for altering operations of the crushing system, wherein the control model is configured to receive as input the error between the predicted post-crush characteristics of the portion of particles and target characteristics.

10. The method of claim 9, wherein obtaining the pre-crush particle data comprises:

obtaining sensor data from a first sensor configured to capture low-resolution image of the portion of particles passing the first sensor at a high rate of throughput; and generating the pre-crush particle data from the sensor data and by a characterization model configured to correlate low-resolution images with higher resolution images of particles and infer the pre-crush particle data based on the correlation.

11. The method of claim 9, wherein the settings of the crushing system include at least one of material feed speed, working surface aperture size, or operating speed.

12. The method of claim 9, comprising:

iteratively predicting post-crush characteristics of crushed particles output by the crushing system and adjusting settings of the crushing system until the error between the predicted post-crush characteristics of crushed particles and the target characteristics of crushed particles is equal to or less than a threshold error.

13. The method of claim 9, wherein the post-crush characteristics comprise geometric characteristics that include at least one of size, shape, surface area, or sphericity.

14. The method of claim 1, wherein comparing the predicted post-crush data with the post-crush particle data to generate training data comprises correlating pre-crush particle data with post-crush data associated with the same particles based on respective timestamps applied to the pre-crush particle data and the post-crush data.

15. A system comprising:

at least one processor; and a data store coupled to the at least one processor having instructions stored thereon which, when executed by the at least one processor, causes the at least one processor to perform operations comprising:

obtaining pre-crush particle data indicating characteristics of a portion of particles before crushing the portion of particles with a crushing system;

obtaining settings data indicating one or more settings of the crushing system;

determining, from the pre-crush particle data and the settings data and by a prediction model, predicted post-crush data that indicates predicted characteristics of the portion of particles at an output of the crushing system, wherein the prediction model is configured to receive both the pre-crush particle data and the settings data as input and predict how the crushing system will process the portion of particles based on both the pre-crush particle data and the settings data;

obtaining post-crush particle data indicating actual characteristics of the portion of particles at the output of the crushing system;

comparing the predicted post-crush data with the post-crush particle data to generate training data; and training the prediction model with the training data.

16. The system of claim 15, wherein obtaining the pre-crush particle data comprises:

obtaining sensor data from a first sensor configured to capture low-resolution image of the portion of particles passing the first sensor at a high rate of throughput; and generating the pre-crush particle data from the sensor data and by a characterization model configured to correlate low-resolution images with higher resolution images of particles and infer the pre-crush particle data based on the correlation.

17. The system of claim 15, wherein post-crush particle data is generated by a characterization model configured to determine particle characteristics from sensor data generated from measurements of the portion of particles after crushing the portion of particles with the crushing system.

18. The system of claim 15, wherein the characteristics comprise geometric characteristics that include at least one of size, shape, surface area, or sphericity.

19. The system of claim 15, wherein the characteristics indicated by the pre-crush particle data include chemical characteristics that include at least one of chemical composition, mineral type, crystalline structure, or reactivity.

20. The system of claim 15, wherein the settings of the crushing system include at least one of material feed speed, working surface aperture size, or crusher operating speed.

21. The system of claim 15, wherein the prediction model comprises a neural network model.

* * * * *